US012781924B2

(12) United States Patent
Kim et al.

(10) Patent No.: US 12,781,924 B2
(45) Date of Patent: Nov. 3, 2026

(54) STORAGE CONTAINER SUPPORT ASSEMBLY

(71) Applicants: Hyundai Motor Company, Seoul (KR); Kia Corporation, Seoul (KR)

(72) Inventors: Myeong Seok Kim, Yongin-si (KR); Bong Won Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 31 days.

(21) Appl. No.: 18/775,330

(22) Filed: Jul. 17, 2024

(65) Prior Publication Data

US 2025/0129896 A1 Apr. 24, 2025

(30) Foreign Application Priority Data

Oct. 23, 2023 (KR) ........................ 10-2023-0142286

(51) Int. Cl.

*F17C 13/08* (2006.01)
*B60L 50/72* (2019.01)
*F17C 1/00* (2006.01)

(52) U.S. Cl.

CPC .............. *F17C 13/084* (2013.01); *F17C 1/00* (2013.01); *B60L 50/72* (2019.02); *F17C 2205/0192* (2013.01); *F17C 2221/012* (2013.01); *F17C 2270/0178* (2013.01)

(58) Field of Classification Search

CPC .......... F17C 2205/0192; F17C 2205/01; F17C 2205/0153; F17C 13/084; F17C 1/00; F17C 2221/012; F17C 2270/0178; F17C 2201/0109; F17C 2201/056; F17C 2270/0184; B60L 50/72; B60K 15/07; B60K 15/03006; B60K 2015/03315

USPC ......................... 220/592, 581, 23.4; 384/192

See application file for complete search history.

(56) References Cited

U.S. PATENT DOCUMENTS

| | | | | |
|---|---|---|---|---|
| 5,515,997 A * | 5/1996 | Kirk | B60P 3/055 220/1.5 |
| 6,986,490 B2 * | 1/2006 | Eihusen | F17C 1/00 248/312 |
| 2009/0097787 A1 * | 4/2009 | Richard | F16C 23/04 29/898.04 |
| 2017/0292563 A1 * | 10/2017 | Boston | F16C 11/069 |

(Continued)

FOREIGN PATENT DOCUMENTS

| | | |
|---|---|---|
| JP | 5718583 B2 | 5/2015 |
| KR | 102410607 B1 | 6/2022 |

OTHER PUBLICATIONS

NHBB, "Engineering Reference Rod End & Spherical Bearings" retrieved from https://web.archive.org/web/20210121135616/https://www.nhbb.com/knowledge-center/engineering-reference/rod-end-spherical-bearings/bearing-types (dated Jan. 21, 2021). (Year: 2021).*

*Primary Examiner* — Laura E. Parker
(74) *Attorney, Agent, or Firm* — Slater Matsil, LLP

(57) ABSTRACT

An embodiment storage container support assembly includes a spherical inner ring coupled to a nozzle disposed at a first end of a storage container and a spherical outer ring including an inner ring hole configured to receive and support the spherical inner ring, wherein a guide groove is disposed on a first side of an inner surface of the inner ring hole in a first direction that is a direction of a central axis of the inner ring hole such that the spherical inner ring is insertable into the inner ring hole, and wherein the guide groove communicates with the inner ring hole.

20 Claims, 9 Drawing Sheets

(56) References Cited

U.S. PATENT DOCUMENTS

2017/0370527 A1* 12/2017 Moutray ................. F17C 13/04
2022/0410700 A1* 12/2022 Cederberg .............. F17C 13/08
2023/0408039 A1* 12/2023 Yim ...................... F17C 13/084

* cited by examiner

STORAGE CONTAINER SUPPORT ASSEMBLY

CROSS-REFERENCE TO RELATED APPLICATIONS

This application claims the benefit of Korean Patent Application No. 10-2023-0142286, filed on Oct. 23, 2023, which application is hereby incorporated herein by reference.

TECHNICAL FIELD

The present disclosure relates to a storage container support assembly for supporting a storage container.

BACKGROUND

In recent years, as awareness of the crisis for an environment and depletion of oil resources increases, research and development on electric vehicles, which are environmental-friendly vehicles, are spotlighted. Examples of the electric vehicles include a plug-in hybrid electric vehicle (PHEV), a battery electric vehicle (BEV), a fuel cell electric vehicle (FCEV), and the like.

The FCEV includes a fuel cell stack that generates electricity using hydrogen, a storage container that stores hydrogen, and a battery pack that stores electrical energy generated by regenerative braking.

FCEVs essentially require storage containers for storing a large amount of hydrogen to increase a range. To secure a long range of FCEVs, the storage containers have a cylindrical shape extending in width directions of vehicles.

Safety devices such as valves may be coupled through nozzles positioned at ends of the storage containers in the width directions of the vehicles. Meanwhile, the storage containers may be expanded or contracted in an axial direction due to high-pressure hydrogen gas, and thus there is a need for support assemblies for more stably supporting the storage containers.

SUMMARY

Embodiments of the present disclosure can solve problems occurring in the prior art while advantages achieved by the prior art are maintained intact.

An embodiment of the present disclosure provides a storage container support assembly that may more stably support a storage container.

Another embodiment of the present disclosure provides a storage container support assembly that may more stably support a nozzle of the storage container and reduce a tolerance occurring during manufacturing.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a storage container support assembly includes a spherical inner ring coupled to a nozzle disposed at a first end of a storage container and a spherical outer ring comprising an inner ring hole configured to receive and support the spherical inner ring, wherein a guide groove is disposed on a first side of an inner surface of the inner ring hole in a first direction that is a direction of a central axis of the inner ring hole such that the spherical inner ring is insertable into the inner ring hole, and wherein the guide groove communicates with the inner ring hole.

The spherical inner ring may include a sliding surface configured to slide while in contact with the inner surface in a state in which the spherical inner ring is inserted into the inner ring hole.

The sliding surface may define a portion of a spherical surface.

The inner surface may surround the sliding surface and correspond to the sliding surface.

The spherical outer ring may include a guide surface that defines the guide groove and is stepped from the inner surface.

The guide surface may extend in parallel to the central axis in the first direction.

A pair of guide grooves may be disposed to be symmetric to each other with respect to the central axis.

The spherical outer ring may be integrated into one component.

The spherical inner ring may be inserted into the inner ring hole and rotatably supported by the spherical outer ring.

According to an embodiment of the present disclosure, a storage container support assembly includes a spherical inner ring coupled to a nozzle disposed at a first end of a storage container, the spherical inner ring having a nozzle hole through which the nozzle is to be inserted, and a spherical outer ring including an inner ring hole configured to receive and support the spherical inner ring, wherein a guide groove is disposed on a first side of an inner surface of the inner ring hole in a first direction that is a direction of a central axis of the inner ring hole such that the spherical inner ring is insertable into the inner ring hole, wherein the guide groove communicates with the inner ring hole, and wherein the spherical inner ring is insertable into the inner ring hole through the guide groove in a state in which the first direction and a second direction that is a direction of a central axis of the nozzle hole are perpendicular to each other.

In a state in which the first direction and the second direction are perpendicular to each other, a front end of the spherical inner ring in a direction in which the spherical inner ring is inserted, may be stopped by the spherical outer ring, and a rear end of the spherical inner ring in the direction in which the spherical inner ring is inserted may be spaced apart from the spherical outer ring.

In a state in which the front end is stopped by the spherical outer ring, the spherical inner ring may be rotatable about the spherical outer ring until the central axis of the nozzle hole and the central axis of the inner ring hole correspond to each other.

The spherical outer ring may include a pair of guide surfaces that define the guide groove, are stepped from the inner surface, and are symmetrical to each other with respect to the central axis. The spherical inner ring may include a sliding surface that defines a portion of a spherical surface such that the spherical inner ring is slidable relative to the guide surfaces in a state in which the spherical inner ring is inserted into the inner ring hole.

An outer diameter of the sliding surface may be greater than a diameter between front ends of the spherical outer ring when viewed in the first direction and may be smaller or equal to a separation distance between the pair of guide surfaces.

The separation distance between the pair of guide surfaces may be twice a radius from the inner ring hole to the inner surface in the first direction.

The outer diameter of the sliding surface may be two times a radius from a center of the nozzle hole to the sliding surface.

A first width of the guide groove in a direction perpendicular to the first direction may be greater than or equal to a second width of the spherical inner ring in the second direction.

According to an embodiment of the present disclosure, a system for supporting a storage container includes the storage container, a nozzle disposed at a first end of the storage container, a mounting neck including a storage container fixing assembly configured to support the nozzle. The storage container fixing assembly may include a spherical inner ring coupled to the nozzle, the spherical ring including a spherical inner ring body that defines a nozzle hole configured to receive the nozzle and a spherical outer ring having an inner surface and comprising an inner ring coupling part that defines an inner ring hole configured to receive and support the spherical inner ring, wherein a guide groove is disposed on a first side of the inner surface in a direction of a central axis of the inner ring hole such that the spherical inner ring is insertable into the inner ring hole, and wherein the guide groove communicates with the inner ring hole.

The spherical inner ring may include a sliding surface configured to slide while in contact with the inner surface in a state in which the spherical inner ring is inserted into the inner ring hole.

The spherical outer ring may include a guide surface that defines the guide groove and is stepped from the inner surface, the guide surface extending in parallel to the central axis in the direction of the central axis.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
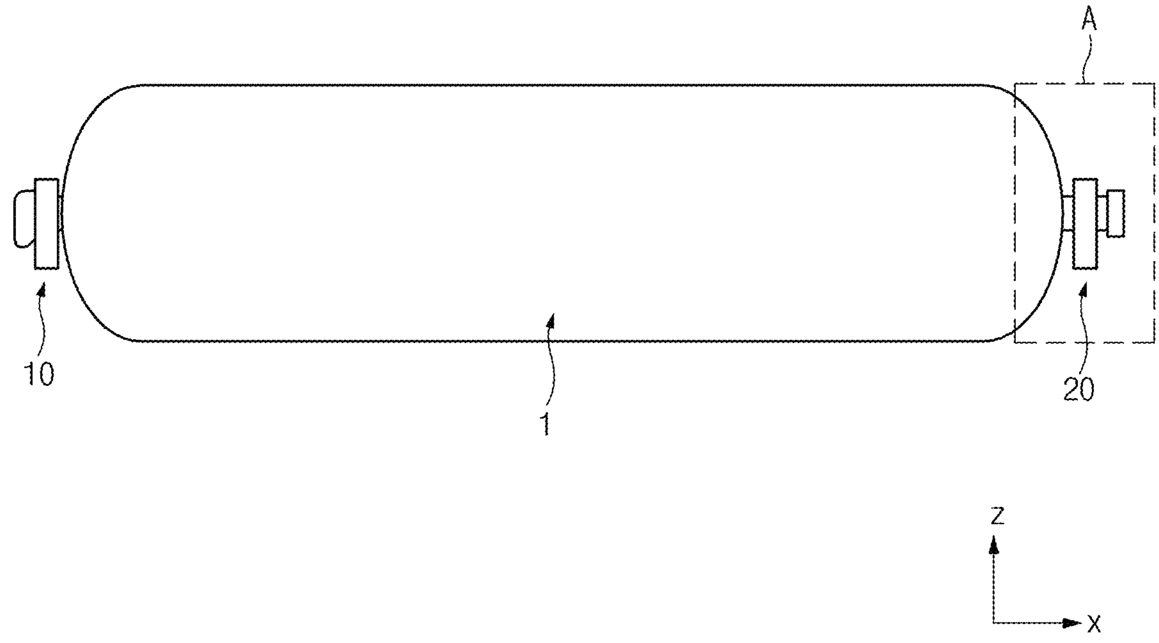
FIG. 1 is a schematic view illustrating a storage container according to an embodiment of the present disclosure.

Hereinafter, some embodiments of the present disclosure will be described in detail with reference to the exemplary drawings. In adding reference numerals to components of each drawing, it should be noted that identical or equivalent components are designated by an identical numeral even when they are displayed on other drawings. Further, in describing the embodiments of the present disclosure, a detailed description of the related known configuration or function will be omitted when it is determined that the detailed description interferes with the understanding of the embodiments of the present disclosure.

In the description of the components of the embodiments of the present disclosure, terms such as first, second, A, B, (a), and (b) may be used. These terms are merely intended to distinguish one component from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail to the reference to FIGS. 1 to 9.

Figure 2:
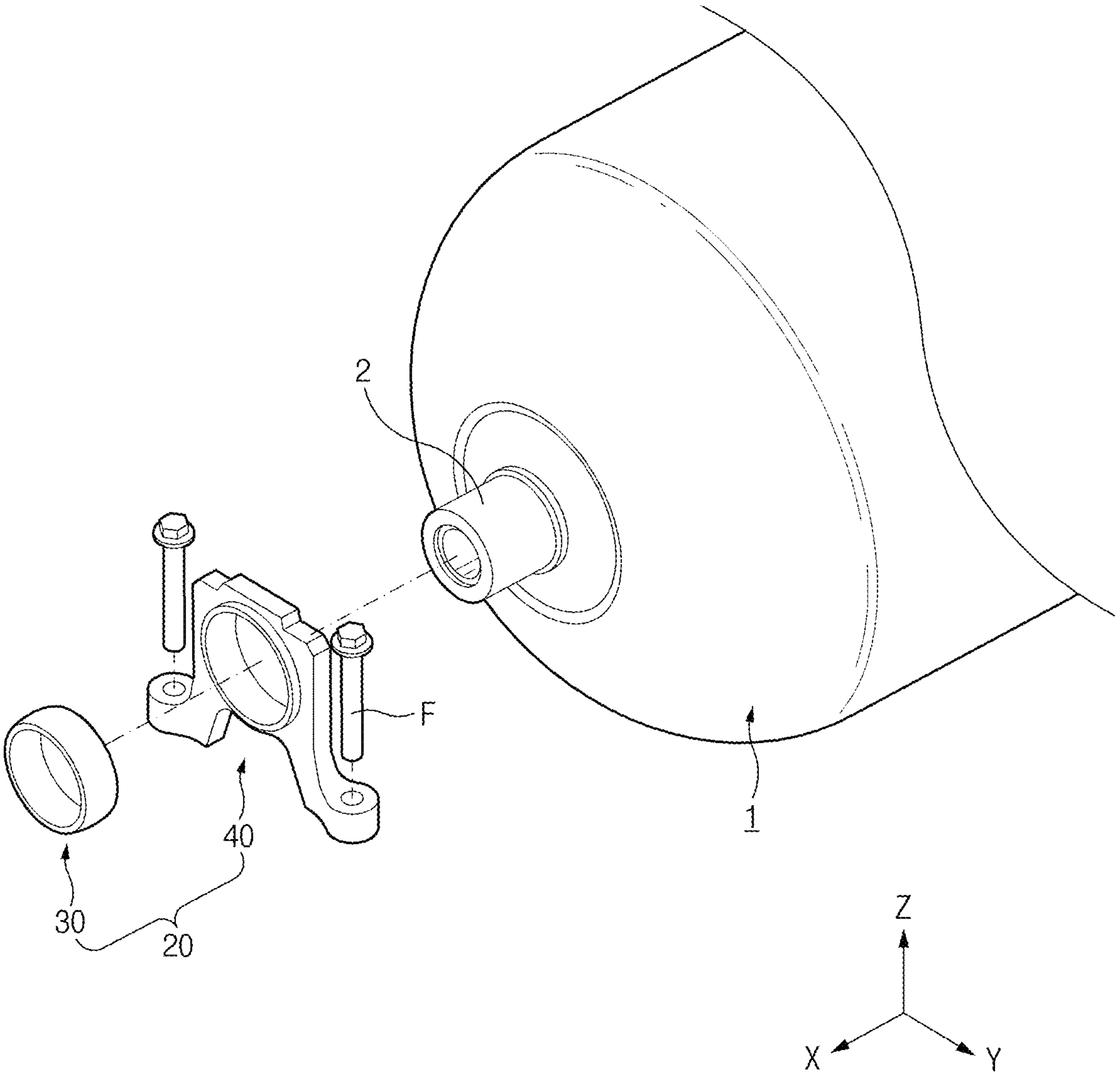
FIG. 2 is an exploded perspective view of a nozzle and a storage container support assembly provided in part "A" of the storage container according to an embodiment of the present disclosure.

FIG. 1 is a schematic view illustrating a storage container according to an embodiment of the present disclosure. FIG. 2 is an exploded perspective view of a nozzle and a storage container support assembly provided in part "A" of the storage container according to an embodiment of the present disclosure.

Referring to FIGS. 1 and 2, a storage container 1 for storing high-pressure hydrogen may have a cylindrical shape extending in a width direction (e.g., an X direction) of a vehicle, and the storage container 1 may include a pair of nozzles 2 provided at both ends thereof. The storage container 1 may include a hydrogen storage tank 1.

The pair of nozzles 2 may be provided to introduce or withdraw hydrogen inside the storage container 1, and a stabilizing device such as a wiring line (not illustrated) may be coupled to the nozzles 2. The pair of nozzles 2 may be formed in a cylindrical shape extending in a longitudinal direction of the storage container 1.

The pair of nozzles 2 provided at both ends of the storage container 1 may be supported by a pair of mounting necks 10 and 20. Each mounting neck 10 or 20 may have a cylindrical shape. A diameter of each mounting neck 10 or 20 may be smaller than a diameter of a cylindrical part of the storage container 1 and greater than a diameter of a cylindrical part of each nozzle 2.

The mounting necks 10 and 20 may include a storage container fixing assembly 10 for fixing a first nozzle provided at one end of the storage container 1 and a storage container support assembly 20 for supporting the second nozzle 2 provided at the other end of the storage container 1.

Although not illustrated in the drawings, the storage container fixing assembly 10 may be directly fastened to the first nozzle through a thread provided in an outer circumferential surface of a cylindrical portion of the first nozzle. The storage container fixing assembly 10 may fix the first nozzle to prevent movement of the first nozzle.

Meanwhile, the storage container 1 may accommodate high-pressure hydrogen therein. The storage container 1 may be expanded or contracted in a radial direction of a body part having a cylindrical shape and may be expanded or contracted in an axial direction of a nozzle part.

In particular, when high-pressure hydrogen is inserted into the storage container 1, for example, when the storage container 1 is being charged, the storage container 1 may be expanded in the longitudinal direction (e.g., an X direction) and the radial direction (a Z direction). On the other hand, when high-pressure hydrogen escapes from the inside of the storage container 1, for example, when a vehicle having the storage container 1 is traveling, the storage container 1 may be contracted in the longitudinal direction and the radial direction.

When the storage container 1 is expanded or contracted, each nozzle of the storage container 1 may have a tendency to be displaced in the axial direction (e.g., the X direction). However, the first nozzle of the storage container 1 is fixed by the storage container fixing assembly 10, and thus the displacement in the axial direction may be prevented.

When the displacement of both the first nozzle 2 and the second nozzle 2 of the storage container 1 in the axial direction is prevented, the body part of the storage container 1 may be further deformed. Thus, the second nozzle 2 of the storage container 1 may be supported not by the storage container fixing assembly 10 but by the storage container support assembly 20 so that the second nozzle 2 is deformed in the axial direction.

Unlike the storage container fixing assembly 10, the storage container support assembly 20 may support the second nozzle 2 so that the second nozzle 2 may be displaced in the axial direction.

The reason why a position of the first nozzle of the storage tank 1 is fixed by the storage container fixing assembly 10 is to prevent interference between other components such as a wiring line connected to the first nozzle.

Meanwhile, embodiments of the present disclosure are not limited thereto, and both ends of the storage container 1 may be provided with the second nozzles 2, and thus each of the pair of second nozzles 2 may be supported by the storage container support assembly 20.

The storage container support assembly 20 may be formed such that the second nozzle 2 is inserted thereinto and may support the second nozzle 2. The second nozzle 2 may rotate while inserted into the storage container support assembly 20.

The storage container support assembly 20 may include a spherical inner ring 30 coupled to the second nozzle 2 and a spherical outer ring 40 for receiving the spherical inner ring 30 and coupled to a vehicle frame (not illustrated) of a vehicle through a fastening member "F."

The spherical inner ring 30 may be inserted into and coupled to the spherical outer ring 40 through an inner ring hole 40*a* (see FIG. 3), and the spherical inner ring 30 may be coupled to the second nozzle 2 through a nozzle hole 30*a*.

Hereinafter, structures of the spherical inner ring 30 and the spherical outer ring 40 will be described in detail.

Figure 3:
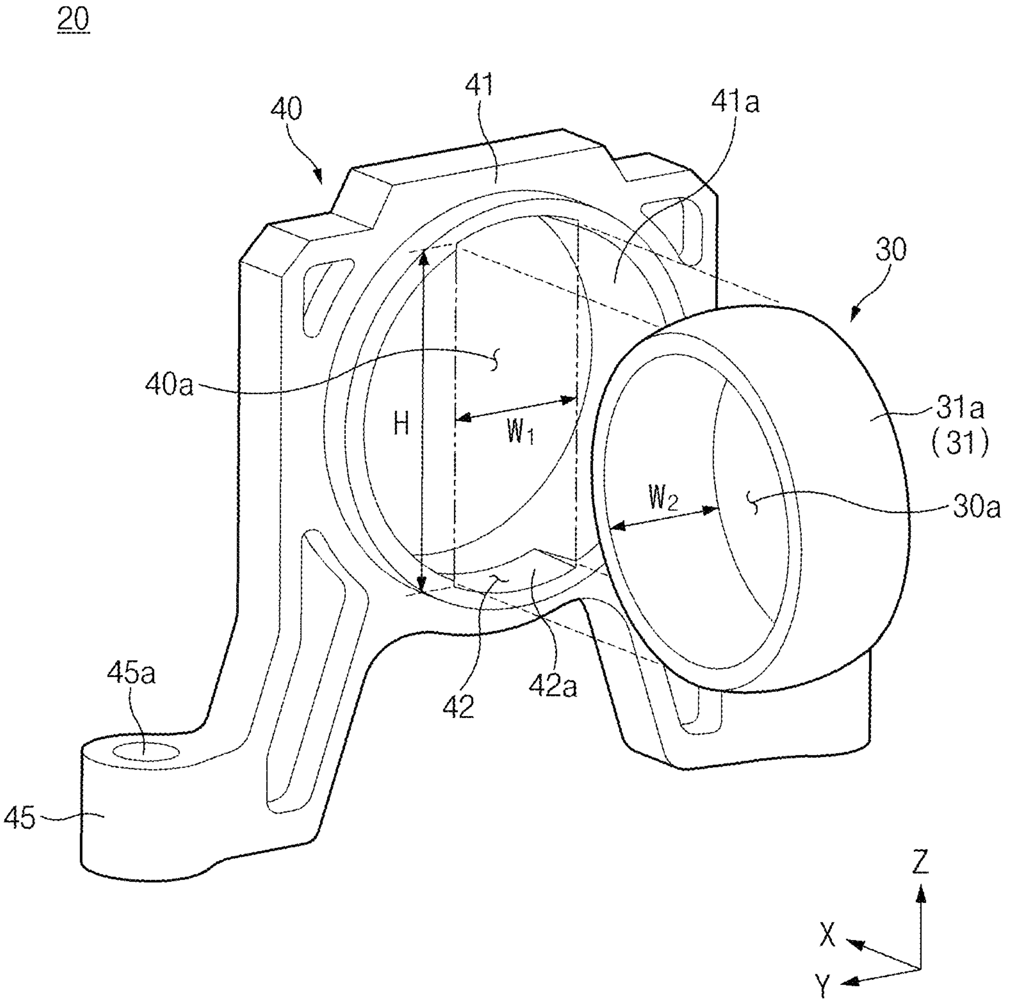
FIG. 3 is an exploded perspective view of the storage container support assembly according to an embodiment of the present disclosure.
Figure 4:
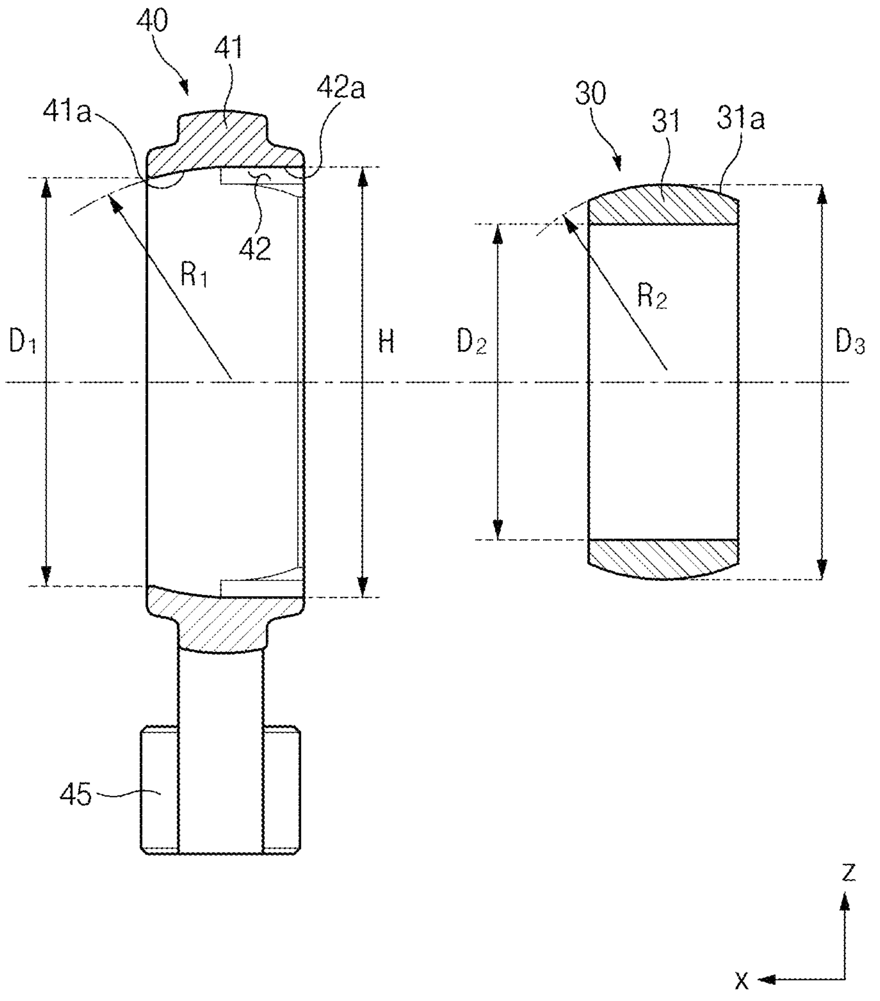
FIG. 4 is a cross-sectional view illustrating a spherical outer ring and a spherical inner ring according to an embodiment of the present disclosure.
Figure 5:
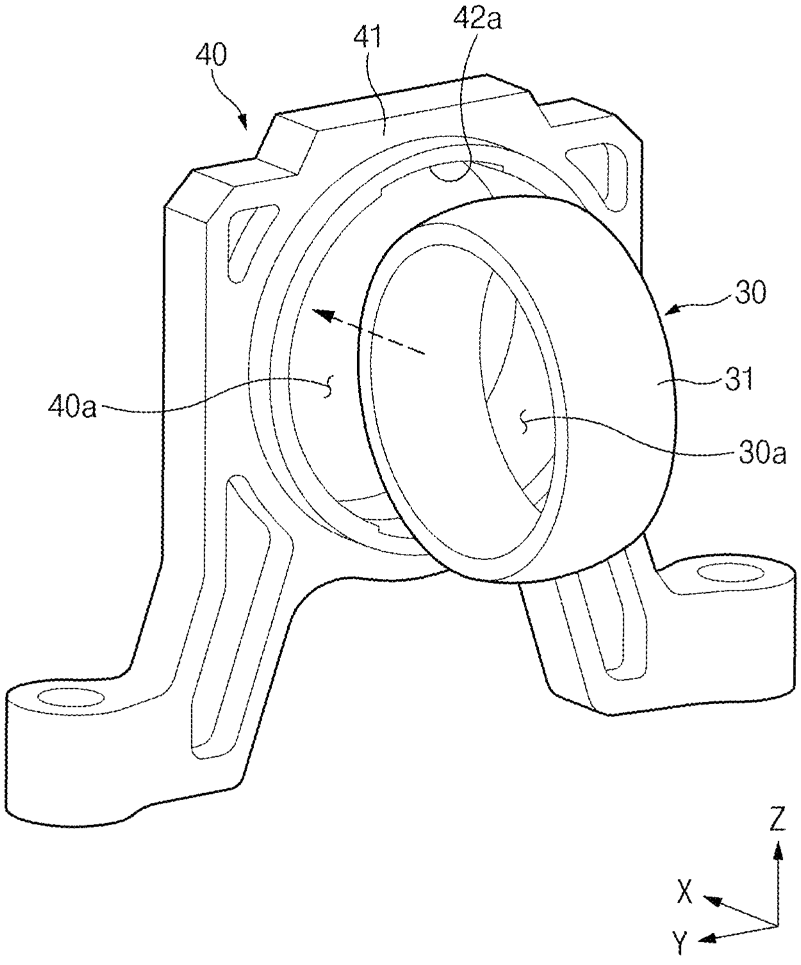
FIG. 5 is a perspective view of a state in which the spherical inner ring is inserted into an inner ring hole according to an embodiment of the present disclosure.
Figure 6:
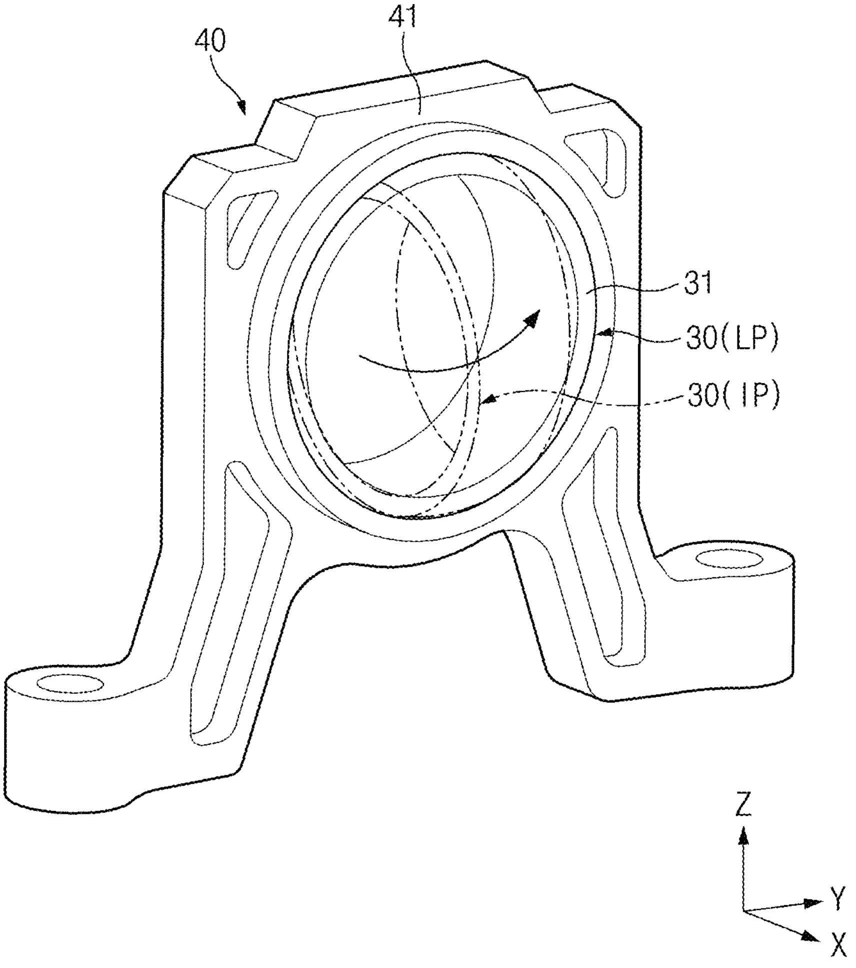
FIG. 6 is a perspective view of a state in which the spherical inner ring inserted into the inner ring hole rotates about the spherical outer ring according to an embodiment of the present disclosure.
Figure 7:
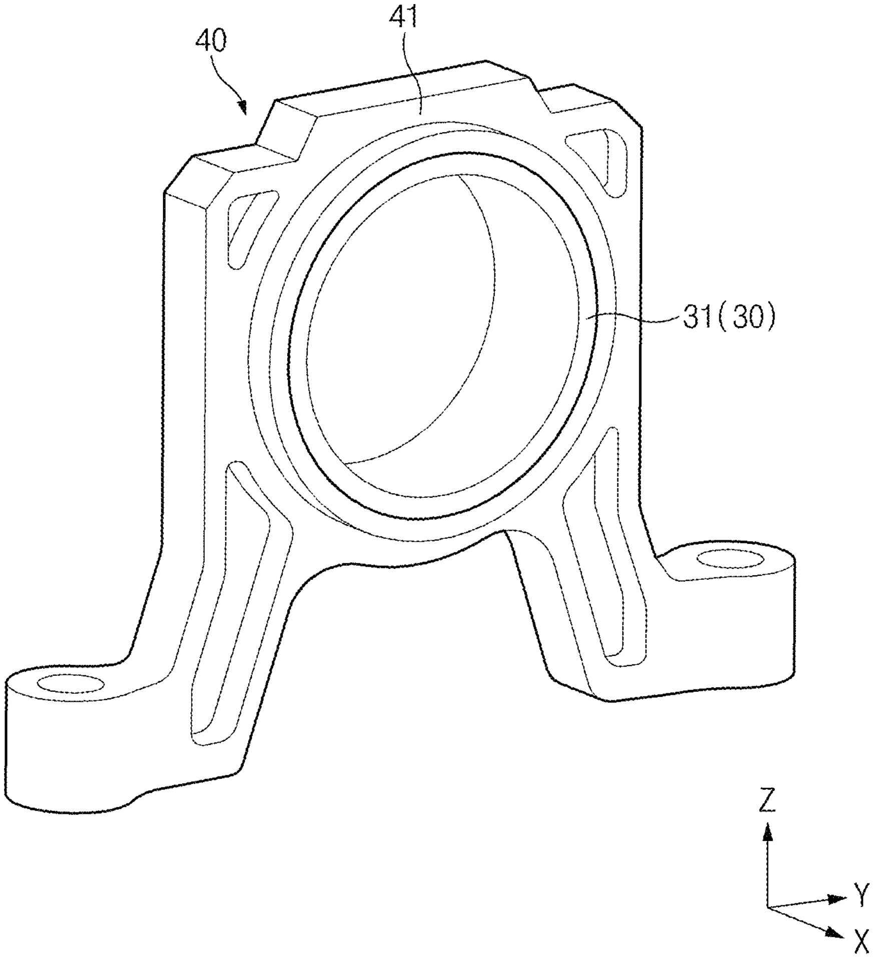
FIG. 7 is a perspective view of a state in which the rotation of the spherical inner ring about the spherical outer ring is completed according to an embodiment of the present disclosure.

FIG. 3 is an exploded perspective view of the storage container support assembly according to an embodiment of the present disclosure. FIG. 4 is a cross-sectional view illustrating a spherical outer ring and a spherical inner ring according to an embodiment of the present disclosure. FIG. 5 is a perspective view of a state in which the spherical inner ring is inserted into an inner ring hole according to an embodiment of the present disclosure. FIG. 6 is a perspective view of a state in which the spherical inner ring inserted into the inner ring hole rotates about the spherical outer ring according to an embodiment of the present disclosure. FIG. 7 is a perspective view of a state in which the rotation of the spherical inner ring about the spherical outer ring is completed according to an embodiment of the present disclosure.

Referring to FIGS. 3 to 7, the spherical inner ring 30 and the spherical outer ring 40 may have a structure of a spherical bearing.

The spherical inner ring 30 may include a spherical inner ring body 31 that forms the nozzle hole 30*a* into which the second nozzle 2 (see FIG. 2) is to be inserted. The spherical inner ring body 31 may be provided in a ring shape to have a sliding surface 31*a* having a portion of a spherical outer surface.

When the spherical inner ring 30 is inserted into the inner ring hole 40*a*, the sliding surface 31*a* may serve as a surface that slides while in contact with the spherical outer ring 40. In more detail, when the spherical inner ring 30 is inserted into the inner ring hole 40*a*, the sliding surface 31*a* may slide while in contact with an inner surface 41*a* of the spherical outer ring 40. Further, the sliding surface 31*a* may be a surface that slides and rotates about the spherical outer ring 40.

When viewed in a central axis of the nozzle hole 30*a*, the nozzle hole 30*a* may have a circular hole shape, and the spherical inner ring body 31 may have an annular shape surrounding the nozzle hole 30*a*.

The spherical outer ring 40 may include a frame coupling part 45 coupled to the vehicle frame and an inner ring coupling part 41 that forms the inner ring hole 40*a* into which the spherical inner ring 30 is to be inserted.

The frame coupling part 45 may include a coupling hole 45*a* into which a coupling member "F" (see FIG. 2) is inserted. A pair of frame coupling parts 45 may be provided and may be positioned on both sides of the inner ring coupling part 41.

The inner ring coupling part 41 may support the spherical inner ring 30 so that the inner ring coupling part 41 rotates while the spherical inner ring 30 is inserted thereinto. The inner ring coupling part 41 may include the inner surface 41*a* that surrounds the sliding surface 31*a* and is formed to correspond to the sliding surface 31*a* that forms a portion of a spherical surface.

The inner surface 41*a* may extend to surround the inner ring hole 40*a* and form the inner ring hole 40*a*. When viewed in a central axis of the inner ring hole 40*a*, the inner ring hole 40*a* may include a circular shape, and the inner ring coupling part 41 may include an annular shape surrounding the inner ring hole 40*a*.

The inner surface 41*a* may include a guide groove 42 provided on one side of the inner ring hole 40*a* in a central axis direction so that the spherical inner ring 30 is to be inserted into the inner ring hole 40*a*. Here, the wording "one side" may be one side facing the spherical inner ring 30 inserted into the inner ring hole 40*a*. The guide groove 42 may communicate with the inner ring hole 40*a*.

A guide surface 42*a* that forms the guide groove 42 may be formed to be stepped upward or downward from the inner surface 41*a*. In other words, the guide surface 42*a* positioned on an upper side of a center of the inner ring hole 40*a* may be stepped upward from the inner surface 41*a*, and the guide surface 42*a* positioned on a lower side of the center of the inner ring hole 40*a* may be stepped downward from the inner surface 41*a*.

Further, the guide surface 42*a* may extend parallel to a direction in which the spherical inner ring 30 is inserted and may be connected to the inner surface 41*a*. That is, the guide surface 42*a* may extend parallel to the central axis of the inner ring hole 40*a* in the central axis direction of the inner ring hole 40*a*.

As described above, the pair of guide surfaces 42*a* may be provided and face each other. The pair of guide surfaces 42*a* may be arranged to be symmetric with each other with respect to the central axis of the inner ring hole 40*a*.

A width W1 of the guide groove 42 in a direction (e.g., a Y direction) perpendicular to the central axis direction of the inner ring hole 40*a* may be greater than or equal to a width W2 of the spherical inner ring 30 in a central axis direction of the nozzle hole 30*a* so that the spherical inner ring 30 is inserted into the inner ring hole 40*a*.

Further, a separation distance "H" between the pair of guide surfaces 42*a*, which is a minimum distance between the pair of guide surfaces 42*a*, may be greater than or equal to a sliding diameter D3 that is an outer diameter of the sliding surface 31*a*. That is, the sliding diameter D3 may be smaller than or equal to the separation distance "H" between the pair of guide surfaces 42*a*.

The sliding diameter D3 may correspond to twice a radius R2 of the sliding surface 31*a*, which is a distance R2 from a center of the spherical inner ring 30 to the sliding surface 31*a* of the spherical inner ring 30. Here, the center of the spherical inner ring 30 may be a center of the nozzle hole 30*a* when viewed in a cross section perpendicular to the central axis direction of the spherical inner ring 30 and may be a central point at which the distance R2 from the sliding surface 31*a* is the same.

Further, the separation distance "H" between the pair of guide surfaces 42*a* may correspond to twice a radius R1 of the inner surface 41*a*, which is a distance R1 from a center of the spherical outer ring 40 to the inner surface 41*a* of the spherical outer ring 40. Here, the center of the spherical outer ring 40 may be a center of the inner ring hole 40*a* when viewed in a cross section perpendicular to a central axis direction of the spherical outer ring 40 and may be a central point at which the distance R1 between the inner surface 41*a* and a center of the inner ring hole 40*a* is the same.

The sliding diameter D3 may be greater than a nozzle hole diameter D2. Meanwhile, the radius R2 of the sliding surface 31*a* may be equal to or smaller than the radius R1 of the inner surface 41*a*. The radius R1 of the inner surface 41*a* may be a value corresponding to half of the separation distance "H" between the pair of guide surfaces 42*a*.

Due to this structure, when the central axis direction of the nozzle hole 30*a* and the central axis direction of the inner ring hole 40*a* are perpendicular to each other, the spherical inner ring 30 may be inserted into the inner ring hole 40*a* through the guide groove 42.

The spherical inner ring 30 may be rotatably supported by the spherical outer ring 40 while inserted into the inner ring hole 40*a*. In order for the spherical inner ring 30 to be rotatably supported within the spherical outer ring 40, it is necessary to prevent the spherical inner ring 30 from escaping from the spherical outer ring 40. To this end, when the central axis direction of the nozzle hole 30*a* and the central axis direction of the inner ring hole 40*a* are perpendicular to each other, a front end of the spherical inner ring 30 in an insertion direction may be stopped by the spherical outer ring 40, and a rear end thereof may be spaced apart from the spherical outer ring 40. In this case, it may be understood that the rear end of the spherical inner ring 30 is spaced apart from the guide surface 42*a* of the spherical outer ring 40.

In more detail, referring to FIG. 4 illustrating a cross section perpendicular to the central axis of the inner ring hole 40*a* and the central axis of the nozzle hole 30*a*, a diameter D1 between front ends of the spherical outer ring 40 may be smaller than the sliding diameter D3. In this case, the diameter D1 between the front ends may mean a minimum separation distance of the inner surface 41*a* when viewed in the central axis direction of the inner ring hole 40*a*.

Due to this structure, the spherical inner ring 30 inserted through the inner ring hole 40*a* may be prevented from being inserted further forward due to a front end of the spherical outer ring 40.

Meanwhile, when viewed in a cross section perpendicular to the central axis of the inner ring hole 40*a*, the inner surface 41*a* may have a curvature in a direction in which the spherical inner ring 30 is inserted.

When viewed on a cross section including the guide surface 42*a*, as the spherical inner ring 30 moves toward the front end in a direction in which the inner ring hole 40*a* is inserted, the inner surface 41*a* may be curved such that a cross-sectional area of the inner ring hole 40*a* decreases.

Figure 9:
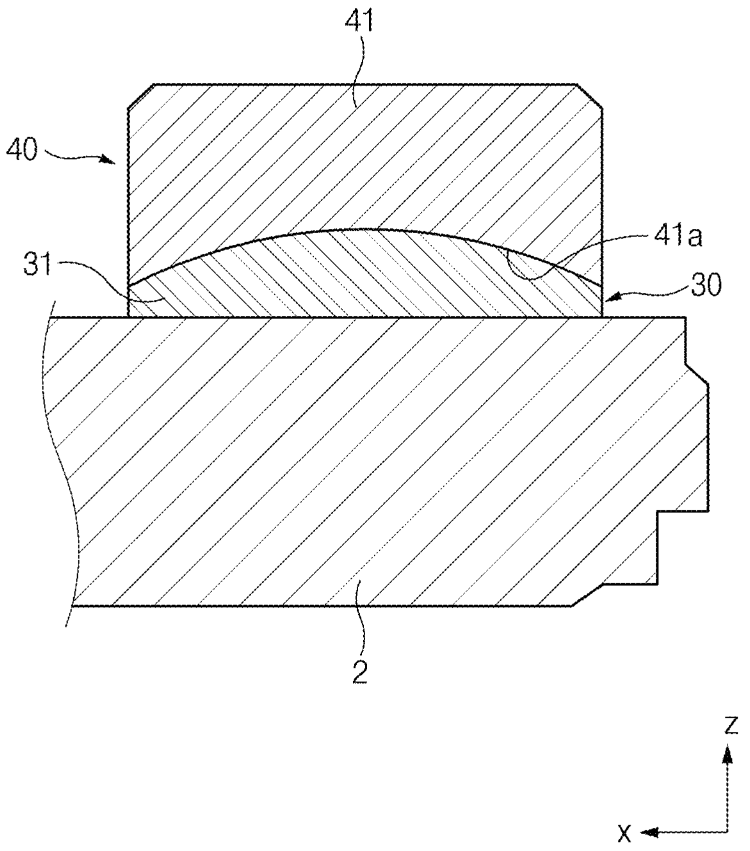
FIG. 9 is a schematic side cross-sectional view of the storage container support assembly and the second nozzle according to an embodiment of the present disclosure.

Further, when viewed in a cross section other than the guide surface 42*a*, the inner surface 41*a* in a direction in which the spherical inner ring 30 is inserted into the inner ring hole 40*a* may form a portion of the spherical surface such that the front end and the rear end are symmetrical to each other (see FIG. 9).

According to this structure, while the central axis direction of the inner ring hole 40*a* and the central axis direction of the nozzle hole 30*a* are perpendicular to each other, the spherical inner ring 30 may be inserted into the inner ring hole 40*a* along the guide surface 42*a* (see FIG. 5).

Meanwhile, due to the sliding surface diameter D3 of the spherical inner ring 30 inserted into the inner ring hole 40*a*, the front end of the spherical inner ring 30 is stopped by the front end of the spherical outer ring 40, and thus the spherical inner ring 30 cannot be further inserted into the inner ring hole 40*a*. The spherical inner ring 30 in this case may be positioned at an insert position IP.

In this case, the rear end of the spherical inner ring 30 may be spaced apart from the guide surface 42*a*. In this state, the spherical inner ring 30 may rotate about the spherical outer ring 40 until the central axis of the inner ring hole 40*a* and the central axis of the nozzle hole 30*a* correspond to each other (see FIG. 6).

Thereafter, when the central axis of the inner ring hole 40*a* and the central axis of the nozzle hole 30*a* correspond to each other, the spherical inner ring body 31 may be fixed while inserted into the inner ring coupling part 41 (see FIG. 7). The spherical inner ring 30 in this case may be positioned at a locking position LP.

Hereinafter, a principle in which the spherical inner ring 30 is fixed to the spherical outer ring 40 will be described with reference to FIGS. 8 and 9.

Figure 8:
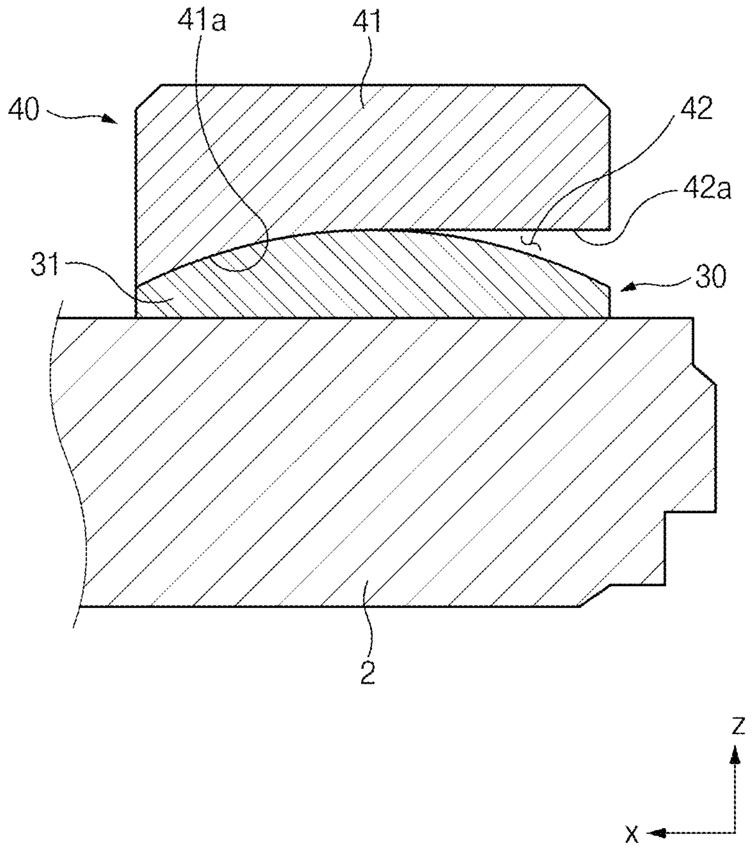
FIG. 8 is a schematic side cross-sectional view of the storage container support assembly and a second nozzle along a central axis of the inner ring hole according to an embodiment of the present disclosure.

FIG. 8 is a schematic side cross-sectional view of a storage tank support assembly and a second nozzle along a central axis of the inner ring hole according to an embodiment of the present disclosure. FIG. 9 is a schematic side cross-sectional view of the storage tank assembly and the second nozzle according to an embodiment of the present disclosure.

In a cross section including the guide groove 42 of the spherical outer ring 40 of the spherical inner ring 30 of FIG.

8, the front end of the spherical inner ring 30 is stopped by the front end of the spherical outer ring 40, and thus the spherical inner ring 30 may be prevented from being inserted further forward. Further, the rear end of the spherical inner ring 30 may be spaced apart from the guide surface 42*a*.

In another cross section not including the guide groove 42 of the spherical outer ring 40 of the spherical inner ring 30 of FIG. 9, the front end of the spherical inner ring 30 is stopped by the front end of the spherical outer ring 40, and thus the spherical inner ring 30 may be prevented from being inserted further forward. Further, since the rear end of the spherical inner ring 30 is formed to be stopped by the inner surface 41*a*, forward or rearward movement of the second nozzle 2 of the spherical inner ring 30 in an axial direction may be restricted.

According to this structure, a problem caused by wear between components may be prevented due to a shape of the spherical bearing for simple fitting. In a geometric shape of embodiments of the present disclosure, the spherical inner ring 30 may not be separated from the spherical outer ring 40 as long as the spherical inner ring 30 is not rotatably inserted into the inner ring hole 40*a* of the spherical outer ring 40 in a predetermined direction by an external force.

That is, despite deformation and rotation of the second nozzle 2, the spherical inner ring 30 may be prevented from being separated from the spherical outer ring 40, and thus safety accidents may be prevented.

Further, according to an embodiment of the present disclosure, the second nozzle 2 of the storage container 1 may be more stably supported by the storage container support assembly 20 despite vibrations caused by displacement of the storage container 1 (see FIG. 1) in a longitudinal direction or twisting of the vehicle body, and thus safety accidents may be prevented.

Meanwhile, the spherical outer ring 40 may be integrated into one component. As described above, since the spherical outer ring 40 is integrated into one component, even when displacement of the second nozzle 2 in an axial direction or displacement of the second nozzle 2 due to rotation occur, the spherical inner ring 30 may be more effectively prevented from being separated from the spherical outer ring 40 even due to vibrations or the like.

In this way, when the spherical inner ring 30 is prevented from being separated from the spherical outer ring 40, safety accidents that may occur due to separation between components related to the storage container 1 may be prevented more effectively.

Further, since the spherical outer ring 40 is integrated, a fastening member required for coupling between the spherical outer rings 40 may be unnecessary, and the spherical outer ring 40 may rotatably and stably support the spherical inner ring 30, and at the same time, a weight of the spherical outer ring 40 is reduced, and thus a weight of the vehicle may be reduced due to the depressed part formed in a surface of the spherical outer ring 40.

The present technology may more stably support a storage container, thereby preventing collisions between the storage containers and thus preventing safety accidents.

Further, the present technology may be durable against deformation of a nozzle of the storage container in an axial direction, and at the same time, rotatably support the nozzle, thereby preventing separation between the storage container and a storage container support assembly.

Further, in this technology, since a spherical inner ring coupled to the nozzle of the storage container is supported by an integrated spherical outer ring, the spherical inner ring may be prevented from being separated from the spherical outer ring, safety may be improved, and thus manufacturing may become easy.

In addition, various effects directly or indirectly identified though the present document may be provided.

The above description is merely illustrative of the technical spirit of the present disclosure, and those skilled in the art to which the present disclosure belongs may make various modifications and changes without departing from the essential features of the present disclosure.

Thus, the embodiments disclosed in the present disclosure are not intended to limit the technical spirit of the present disclosure but are intended to describe exemplary embodiments of the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A hydrogen storage container support assembly, comprising:
- a spherical inner ring configured to couple to a nozzle disposed at a first end of a hydrogen storage container and comprising a nozzle hole through which the nozzle is to be inserted; and
- a spherical outer ring comprising an inner ring hole configured to receive and support the spherical inner ring, wherein:
  - a guide groove is disposed on a first side of an inner surface of the inner ring hole in a first direction that is a direction of a central axis of the inner ring hole such that the spherical inner ring is insertable into the inner ring hole,
  - the guide groove communicates with the inner ring hole,
  - the spherical inner ring is configured to rotate between:
    - an insert position where the spherical inner ring is inserted into the inner ring hole through the guide groove such that a central axis of the nozzle hole is a second direction perpendicular to the first direction, and the spherical inner ring is in contact with the inner surface; and
    - a locking position where the spherical inner ring is inserted into the inner ring hole such that the central axis of the nozzle hole corresponds to the first direction, and front and rear ends of the spherical inner ring in the first direction are respectively aligned with front and rear ends of the inner surface in the first direction,
  - the spherical outer ring further comprises:
    - an inner ring coupling part defining the inner ring hole; and
    - an annular rib protruding from the inner ring coupling part in opposite directions along the first direction and extending along a circumferential direction of the inner ring hole, and
  - the guide groove is formed in the annular rib.

2. The hydrogen storage container support assembly of claim 1, wherein the spherical inner ring comprises a sliding surface configured to slide while in contact with the inner surface in a state in which the spherical inner ring is inserted into the inner ring hole.

3. The hydrogen storage container support assembly of claim 2, wherein the sliding surface defines a portion of a spherical surface.

4. The hydrogen storage container support assembly of claim 2, wherein the inner surface surrounds the sliding surface.

5. The hydrogen storage container support assembly of claim 1, wherein the spherical outer ring comprises a guide surface that defines the guide groove and is stepped from the inner surface.

6. The hydrogen storage container support assembly of claim 5, wherein the guide surface extends parallel to the central axis of the inner ring hole.

7. The hydrogen storage container support assembly of claim 1, wherein a pair of guide grooves are disposed to be symmetric to each other with respect to the central axis of the inner ring hole.

8. The hydrogen storage container support assembly of claim 1, wherein the spherical outer ring is integrated into one component.

9. The hydrogen storage container support assembly of claim 1, wherein the spherical inner ring is inserted into the inner ring hole and rotatably supported by the spherical outer ring.

10. A storage container support assembly, comprising:

a spherical inner ring configured to couple to a nozzle disposed at a first end of a storage container, the spherical inner ring comprising a nozzle hole through which the nozzle is to be inserted; and a spherical outer ring comprising an inner ring hole configured to receive and support the spherical inner ring, wherein:

a guide groove is disposed on a first side of an inner surface of the inner ring hole in a first direction that is a direction of a central axis of the inner ring hole such that the spherical inner ring is insertable into the inner ring hole, the guide groove communicates with the inner ring hole, the spherical inner ring is insertable into the inner ring hole, the spherical inner ring is configured to rotate between:

an insert position where the spherical inner ring is inserted into the inner ring hole through the guide groove so that a central axis of the nozzle hole is a second direction perpendicular to the first direction, and the spherical inner ring is in contact with the inner surface; and a locking position where the spherical inner ring is inserted into the inner ring hole so that the central axis of the nozzle hole corresponds to the first direction, and front and rear ends of the spherical inner ring in the first direction are respectively aligned with front and rear ends of the inner surface in the first direction, the spherical outer ring further includes:

an inner ring coupling part defining the inner ring hole; and an annular rib protruding from the inner ring coupling part in opposite directions along the first direction and extending along a circumferential direction of the inner ring hole, and the guide groove is formed in the annular rib.

11. The storage container support assembly of claim 10, wherein:

when the spherical inner ring is positioned at the insert position, the front end of the spherical inner ring in an insertion direction through the guide groove is stopped by the spherical outer ring, and the rear end of the spherical inner ring in the insertion direction is spaced apart from the spherical outer ring.

12. The storage container support assembly of claim 11, wherein, in a state in which the front end is stopped by the spherical outer ring, the spherical inner ring is rotatable about the spherical outer ring until the central axis of the nozzle hole and the central axis of the inner ring hole correspond to each other.

13. The storage container support assembly of claim 11, wherein:

the spherical outer ring comprises a pair of guide surfaces that define the guide groove, are stepped from the inner surface, and are symmetrical to each other with respect to the central axis of the inner ring hole; and the spherical inner ring comprises a sliding surface that defines a portion of a spherical surface such that the spherical inner ring is slidable relative to the guide surfaces in a state in which the spherical inner ring is inserted into the inner ring hole.

14. The storage container support assembly of claim 13, wherein a diameter of the sliding surface is greater than a diameter between front ends of the spherical outer ring when viewed in the first direction and is smaller than or equal to a separation distance between the pair of guide surfaces.

15. The storage container support assembly of claim 14, wherein the separation distance between the pair of guide surfaces is twice a radius from a center of the inner ring hole in a direction perpendicular to the first direction to the inner surface.

16. The storage container support assembly of claim 10, wherein a first width of the guide groove in the second direction is greater than or equal to a second width of the spherical inner ring in the second direction.

17. A system for supporting a hydrogen storage container, the system comprising:

the hydrogen storage container;

a nozzle disposed at a first end of the hydrogen storage container;

a mounting neck comprising a hydrogen storage container fixing assembly configured to support the nozzle, the hydrogen storage container fixing assembly comprising:

a spherical inner ring coupled to the nozzle, the spherical inner ring comprising a spherical inner ring body that defines a nozzle hole configured to receive the nozzle; and a spherical outer ring having an inner surface and comprising an inner ring coupling part that defines an inner ring hole configured to receive and support the spherical inner ring, wherein a guide groove is disposed on a first side of the inner surface in a first direction that is a direction of a central axis of the inner ring hole such that the spherical inner ring is insertable into the inner ring hole, wherein:

the guide groove communicates with the inner ring hole, the spherical inner ring is configured to rotate between:

an insert position where the spherical inner ring is inserted into the inner ring hole through the guide groove so that a central axis of the nozzle hole is a second direction perpendicular to the first direction, and the spherical inner ring is in contact with the inner surface, and a locking position where the spherical inner ring is inserted into the inner ring hole so that the central axis of the nozzle hole corresponds to the first direction, and front and rear ends of the spherical inner ring in the first direction are respectively aligned with front and rear ends of the inner surface in the first direction, the spherical outer ring further includes an annular rib protruding from the inner ring coupling part in opposite directions along the first direction and extending along a circumferential direction of the inner ring hole, and the guide groove is formed in the annular rib.

18. The system of claim 17, wherein the spherical inner ring comprises a sliding surface configured to slide while in contact with the inner surface in a state in which the spherical inner ring is inserted into the inner ring hole.

19. The system of claim 17, wherein the spherical outer ring comprises a guide surface that defines the guide groove and is stepped from the inner surface, the guide surface extending in parallel to the central axis of the inner ring hole.

20. The system of claim 17, wherein the spherical inner ring is rotatable within the inner ring hole.

* * * * *